United States Patent

[11] 3,619,037

| [72] | Inventor | Alexander L. Pugh, Jr. |
| --- | --- | --- |
|  |  | Paoli, Pa. |
| [21] | Appl. No. | 760,768 |
| [22] | Filed | Sept. 19, 1968 |
| [45] | Patented | Nov. 9, 1971 |
| [73] | Assignee | TRW Inc. |
|  |  | Philadelphia, Pa. |

[54] LASER BEAM SHUTTER INCLUDING A HEAT SINK
7 Claims, 3 Drawing Figs.

[52] U.S. Cl. .................................................. 350/269,
356/275
[51] Int. Cl. .................................................. G02f 1/30
[50] Field of Search .................................................. 350/269,
275, 81; 331/94.5

[56] References Cited
UNITED STATES PATENTS
3,275,831  9/1966  Martin ....................... 250/105

Primary Examiner—Ronald L. Wibert
Assistant Examiner—Orville B. Chew, II
Attorneys—Donald C. Keaveney, Alfred B. Levine and Paris, Haskell & Levine ABSTRACT: A control for disrupting and permitting the flow of the output beam of a laser to a workpiece. The control includes a shutter mounted in the path of the output beam and movable between a position in which the shutter extends across the path of the output beam so as to disrupt the beam, and a position in which the beam is allowed to pass the shutter. A metal heat sink surrounds the shutter. When the shutter extends across the path of the beam, the shutter deflects the beam against the surface of the heat sink which dissipates the heat developed by the beam.

PATENTED NOV 9 1971 3,619,037

INVENTOR
ALEXANDER L. PUGH, JR.

BY

ATTORNEY

LASER BEAM SHUTTER INCLUDING A HEAT SINK

BACKGROUND OF INVENTION

In the use of a laser for working a metal member, such as for cutting a fine path in a metal film, it is desirable to be able to quickly start and stop the working of the metal member by the laser beam. This is particularly desirable in cutting a fine path in a metal film where a sharp beginning and end of the cut path is desirable. Turning off and on the input current to the laser in order to turn off and on the glow discharge of the laser beam has been found to be unsatisfactory for this purpose. This is the result of the fact when the current of the laser is turned on there is a gradual build up of the laser beam and when the input current is turned off by the beam gradually decreases. Therefore it is an object of the present invention to provide a control for the output beam of a laser which quickly starts and stops the presentation of the beam to a workpiece.

SUMMARY

The present invention relates to a control for quickly disrupting and permitting the flow of the beam of a laser to a workpiece. The control comprises a cylindrical shutter mounted in the path of the laser beam. The shutter has a pair of diametrically opposite holes therethrough. Operating means is connected to the shutter so as to rotate the shutter between a position in which the holes are in alignment with the path of the laser beam so as to allow the beam to pass therethrough, and a position in which the holes are out of alignment with the path of the laser beam so as to disrupt the laser beam. A metal heat sink surrounds the shutter and has openings which permit the laser beam to pass through the heat sink. When the holes in the shutter are out of alignment with the path of the laser beam, the shutter deflects the laser beam against the heat sink which dissipates the heat created by the laser beam.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

DESCRIPTION OF INVENTION

Figure 1:
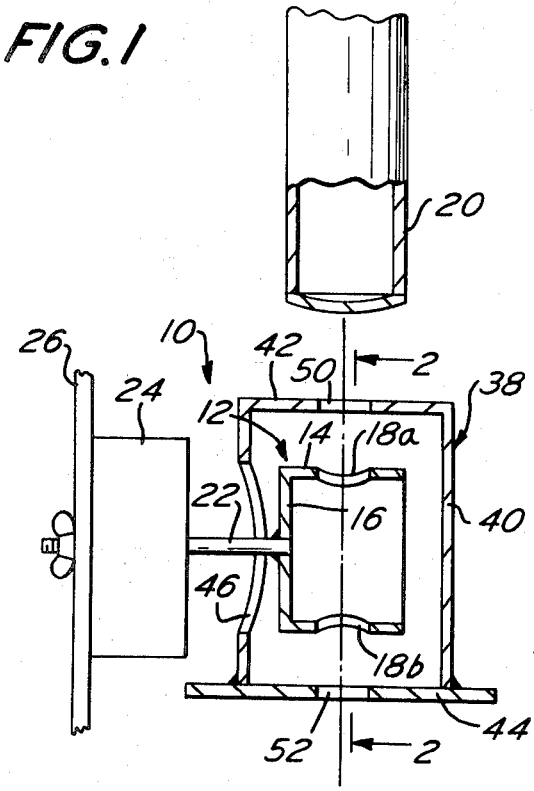
FIG. 1 is a partial sectional view of the control of the present invention.

Referring to the drawings, the control of the present invention is generally designated as 10.

Control 10 comprises a shutter 12 having a cylindrical wall 14 and a base 16 extending across the one end of the cylindrical wall. The cylindrical wall 14 has a pair of diametrically opposite holes 18a and 18 b therethrough. The shutter 12 is mounted at the front end of a laser 20 with the cylindrical wall 14 extending across the path of the output beam of the laser. The holes 18a and 18b in the cylindrical wall 14 are of size slightly larger than the diameter of the laser beam. The shutter 12 is of a metal which will withstand the heat created by the beam of the laser 20, such as stainless steel, and/or the outer surface of the cylindrical wall 14 is polished so as to deflect the beam without creating sufficient heat to damage the shutter.

Figure 3:
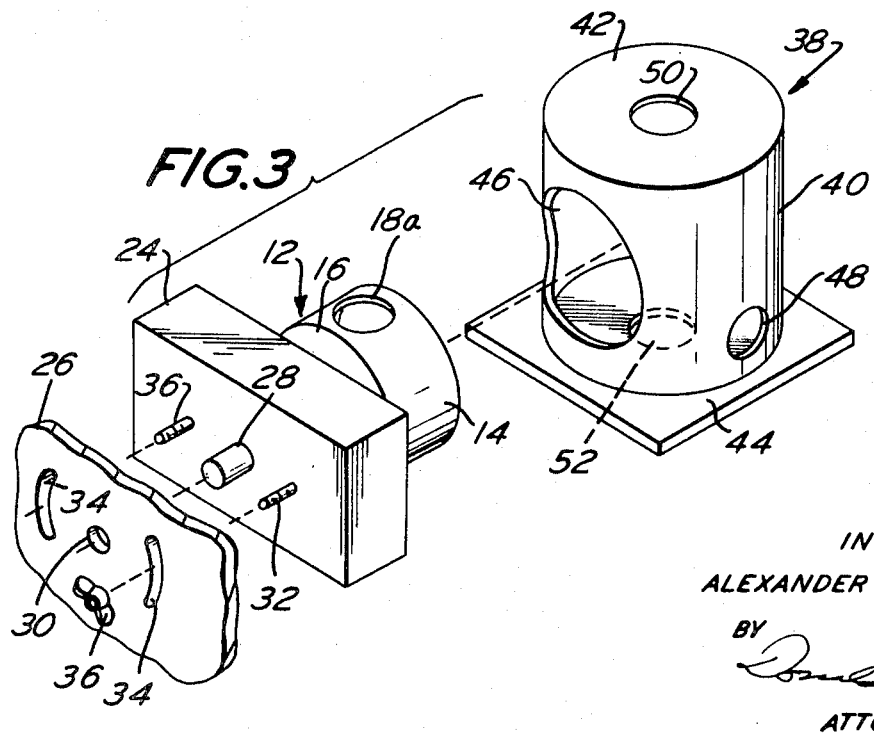
FIG. 3 is an exploded perspective view of the control of the present invention.

The shutter 12 is mounted at the center of its base 16 on the end of the shaft 22 of the rotary solenoid 24. The solenoid 24 is mounted on a panel 26 which may be part of or mounted on the housing of the laser 20. As shown in FIG. 3, pin 28 extends from the back surface of the solenoid in alignment with the shaft 22, and extends through a hole 30 in the panel 26. A pair of threaded pins 32 extend from the back surface of the solenoid 24 at diametrically opposite sides of the pin 28. The threaded pins 32 extend through arcuate slots 34 in the panel 26. A nut 36 is threaded on the end of each threaded pin 32 to secure the solenoid to the panel 26. The arcuate slots 34 allow for rotational adjustment of the position of the solenoid 24 so as to properly position the holes 18a and 18b in the shutter 12 with regard to the laser beam.

A heat sink 38 in mounted around the shutter 12. Heat sink 38 comprises a housing of a good heat-conductive metal, such as aluminum, having a cylindrical wall 40, an end wall 42 extending across one end of the cylindrical wall, and a base plate 44 extending across the other end of the cylindrical wall. The base plate 44 extends radially beyond the cylindrical wall to permit the base plate to be secured to a suitable support. The cylindrical wall 40 has an opening therethrough of a size which will permit the shutter 12 to pass through the opening. A small hole 48 is provided through the cylindrical wall 40 to permit air to circulate through the heat sink. The end wall 42 and base plate 44 have aligned holes 50 and 52 respectively therethrough. The holes 50 and 52 are of a size to permit the laser beam to pass therethrough. The heat sink 38 is mounted around the shutter 12 with the end wall 42 being adjacent the end of the laser 20 and with the holes 50 and 52 being in alignment with the path of the laser beam. Preferably, the inner surface of the heat sink 38 is polished.

Figure 2:
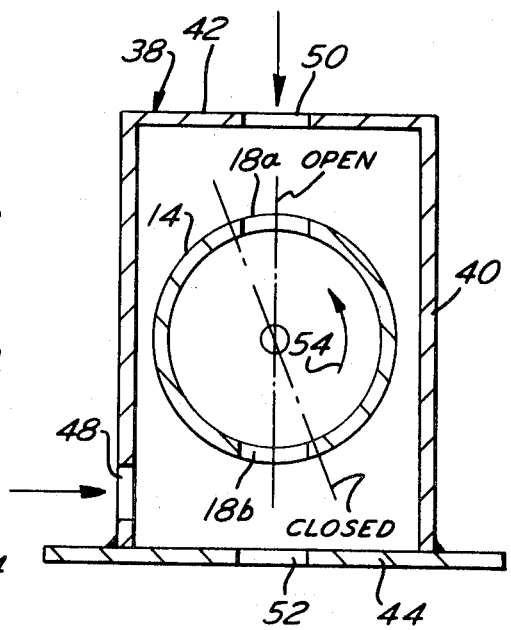
FIG. 2 is a sectional view along line 2—2 of FIG. 1.

In operation of the control 10 of the present invention, the solenoid rotates the shutter 12 between the open position in which, as shown in FIG. 2, the holes 18a and 18b are in alignment with the path of the output beam of the laser 20, and a closed position in which the holes 18a and 18b are out of alignment with the path of the laser beam. In the open position of the shutter 12, the output beam of the laser 20 passes through the hole 50 in the end wall 42 of the heat sink, the holes 18a and 18b of the shutter 12 and the hole 52 in the base plate 44 of the heat sink to the workpiece. When the solenoid rotates the shutter 12 to its closed position in the direction of the arrow 54 in FIG. 2, the edge of the hole 18a in the shutter moves across the laser beam in one direction and the edge of the hole 18b moves across the beam in the opposite direction. Thus, a movement of the shutter 12 along a distance equal to substantially one-half of the diameter of the laser beam completely disrupts the flow of the laser beam past the shutter so as to quickly cut off the flow of the laser beam to the workpiece. When the shutter is rotated back to its open position, the laser beam is quickly permitted to flow through the holes in the shutter to the workpiece.

In the closed position of the shutter 12, the laser beam is deflected by the curved surface of the shutter onto the inner surface of the heat sink 38 which dissipates the heat created by the laser beam. By having the inner surface of the heat sink 38 polished, the laser beam is deflected back and forth across the heat sink so that the deflected laser beam contacts the heat sink at a plurality of different points. This reduces the amount of heat created at any point of contact of the laser beam with the heat sink so as to prevent damage to the heat sink by the heat created by the laser beam.

Thus, with the control 10 of the present invention, the flow of the output beam of the laser to a workpiece can be quickly disrupted and turned on so as to provide a sharp starting and stopping of the working of the workpiece by the laser beam. Also, while the flow of the laser beam is disrupted, the heat created by the laser beam is dissipated without causing any damage to the control, the laser of any of the associated parts of the laser.

The present invention may be embodied in other specific forms without departing from the spirit or essential attributes, thereof and, accordingly, reference should be made to the appended claims, rather than the the foregoing specifications as indicating the scope of the invention 1. In a system including a laser which provides a luminous beam from an end thereof, a control for disrupting and permitting the flow of said beam comprising a metal shutter mounted adjacent said one end of the laser, said shutter being movable between a closed position in which the shutter extends the path of the beam so as to disrupt the flow of the beam and an open position in which the shutter does not extend across the path of the beam so as to per mint the flow of the beam, means for moving said shutter between its closed and open positions, and a metal heat sink surrounding said shutter, said shutter in its closed position deflecting the beam onto the surface of the heat sink so as to dissipate the heat created by the beam.

2. A control in accordance with claim 1 in which the shutter includes a cylindrical wall extending across the path of the beam and having a pair of diametrically opposite holes therethrough, said holes being in alignment with the path of the beam when the shutter is in its open position and being out of alignment with the path of the beam when the shutter is in its closed position.

3. A control in accordance with claim 2 in which the means for moving the shutter between its open and closed positions comprises means for rotating the shutter about the longitudinal axis of the cylindrical wall.

4. A control in accordance with claim 3 in which the means for rotating the shutter is a rotary solenoid.

5. A control in accordance with claim 4 in which the shutter includes a base extending across an end of the cylindrical wall and the solenoid includes a shaft connected to the center of the base of the shutter.

6. A control in accordance with claim 2 in which the heat sink comprises a housing having a cylindrical wall extending around the shutter with the longitudinal axis of the cylindrical wall being parallel to the path of the laser beam, and a separate wall extending across each end of the cylindrical wall, each of said end walls having a hole therethrough in alignment with the path of the beam so as to allow the beam to pass therethrough.

7. A control in accordance with claim 6 in which the cylindrical wall of the heat sink housing has an opening therethrough of a size which permits the shutter to pass through said opening.

* * * * *